(12) United States Patent
Liu

(10) Patent No.: US 7,340,080 B2
(45) Date of Patent: Mar. 4, 2008

(54) FINGERPRINT VERIFICATION METHOD AND APPARATUS BASED ON GLOBAL RIDGELINE

(75) Inventor: Zhongqiu Liu, Hangzhou (CN)

(73) Assignee: Miaxis Biometrics Co., Ltd., Hangzhou (CN)

( * ) Notice: Subject to any disclaimer, the term of this patent is extended or adjusted under 35 U.S.C. 154(b) by 499 days.

(21) Appl. No.: 11/108,272

(22) Filed: Apr. 18, 2005

(65) Prior Publication Data

US 2005/0232473 A1  Oct. 20, 2005

(30) Foreign Application Priority Data

Apr. 18, 2004  (CN) .................. 2004 1 0017825

(51) Int. Cl.
*G06K 9/00* (2006.01)
(52) U.S. Cl. .......................... 382/124; 382/125
(58) Field of Classification Search ............... D14/384; 283/68, 78; 340/5.53, 5.83; 382/124, 125; 396/15

See application file for complete search history.

(56) References Cited

U.S. PATENT DOCUMENTS 5,812,252 A * 9/1998 Bowker et al. ............... 356/71
2005/0152586 A1 * 7/2005 Shatford .................... 382/124

* cited by examiner

Primary Examiner—Matthew C. Bella
Assistant Examiner—G. F. Cunningham
(74) Attorney, Agent, or Firm—Dorsey & Whitney LLP

(57) ABSTRACT

This invention refers to a fingerprint verification method and apparatus based on global ridgeline. Firstly, the invention search base point pair between the stored fingerprint template and the fingerprint template to be matched. The said base point pair is the positioning reference for position calibration between the stored fingerprint template and the fingerprint template to be matched. Secondly, generates fingerprint template after minutiae extraction with additional use of thinned global fingerprint ridgeline information. Then, observe similarity of minutiae topological structure or surrounding ridgeline distribution to determine base point pairs. Finally, align two fingerprints through base point pair alignment. Calculate matching ratio of ridgelines to determine whether two fingerprints match. Beneficial results of present invention: By using global ridgeline information, efficiency of searching & interference resistance capacity is greatly enhanced. Present invention overcomes disadvantage of fingerprint verification method based on minutiae, i.e. difficulty to verify fingerprints with too few minutiae points.

10 Claims, 2 Drawing Sheets

Working Principle of the Invention

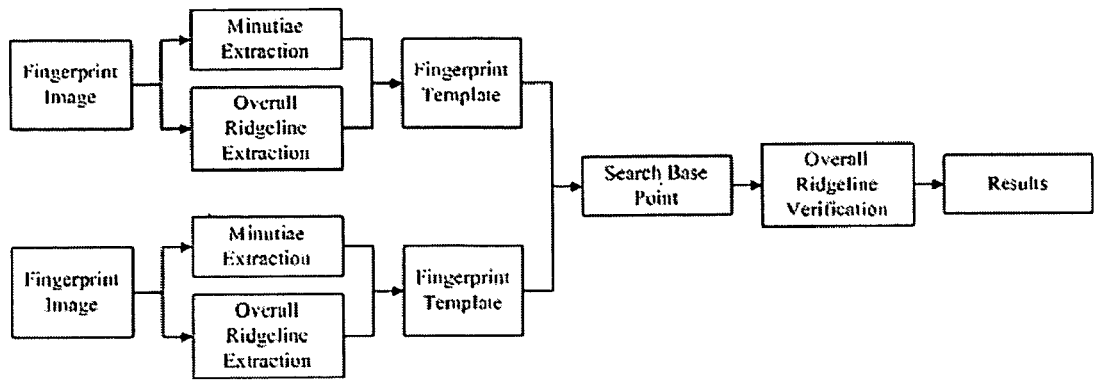
Figure 1  Working Principle of the Invention
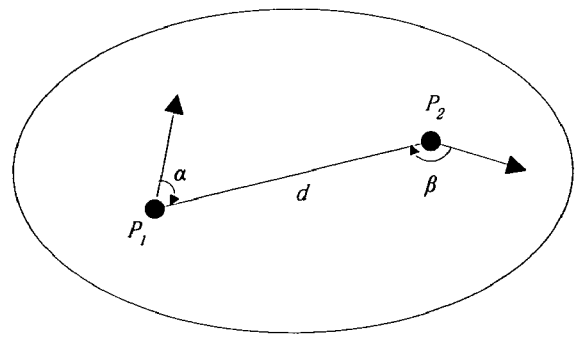
Figure 2  Topological Structure between Minutiae $P_1$ and $P_2$
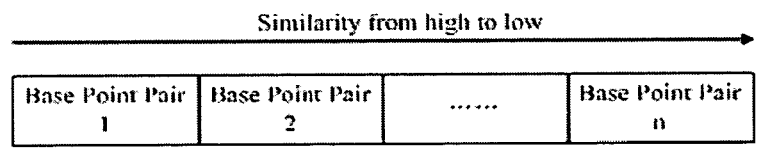
Figure 3  Base Point Pair Queue

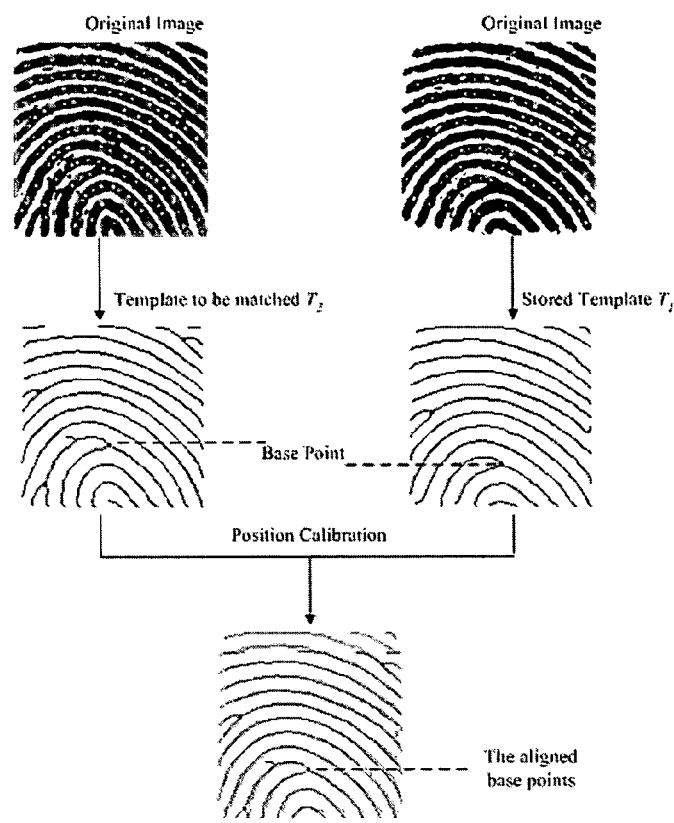
Figure 4   Template Position Calibration
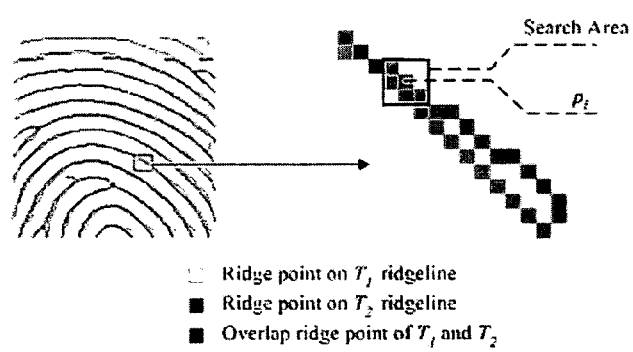
Figure 5   Ridgeline Point Verification

FINGERPRINT VERIFICATION METHOD AND APPARATUS BASED ON GLOBAL RIDGELINE

FIELD OF INVENTION

This invention relates generally to a method and apparatus for fingerprint verification; and more particularly refer to a fingerprint verification method and apparatus based on global ridgeline.

BACKGROUND OF THE INVENTION

Fingerprint verification is the process to determine whether two fingerprints are taken from the same finger. There are various methods of fingerprint verification. The most commonly used is called the fingerprint verification based on minutiae. Its working theory is as follows: (1) generate fingerprint templates by extracting minutiae (mainly refers to ridgeline ends and ridgeline bifurcations); (2) check the number of identical minutiae from the two templates; and (3) get verification results based on the number of identical minutiae.

As two fingerprints shall be placed on the same system in order to conduct fingerprint verification, therefore it is necessary to determine base point pair and align the two fingerprint images. There are various ways to search base point pair. The most commonly used method is to search base point pair in terms of minutiae type, minutiae direction and ridgeline curve.

The Chinese Patent case No. ZL88108482.4 (Publication No. CN1054225C) reveals an automatic fingerprint verification method. By comparing the minutiae of each fingerprint in the fingerprint database with that of the pre-calculated vector image of the to-be-verified fingerprint, the method is able to tell whether there is consistency between the fingerprint minutiae in database and the minutiae image of the to-be-verified fingerprint in terms of position and angle. The aforesaid fingerprint verification method is actually the improved version of the fingerprint verification method based on minutiae. The advantages of fingerprint verification method based on minutiae lie on the small size of fingerprint template and the high verification speed. Its disadvantages are: low efficiency in searching base point pair; inclination to lose true minutiae due to noise interference and image processing, which normally results in low identification rate; that it requests adequate number of minutiae to conduct valid verification, which normally results in limited application.

SUMMARY OF THE INVENTION

The purpose of the present invention is to provide a fingerprint verification method and apparatus based on global ridgeline. The said invention generates fingerprint template after minutiae extraction with additional use of thinned global fingerprint ridgeline information. Then, observe the similarity of minutiae topological structure or the surrounding ridgeline distribution to determine base point pairs. Finally, align the two fingerprints through base point pair alignment. Calculate the matching ratio of the ridgelines to determine whether the two fingerprints match.

The technical solution of the present invention to overcome the disadvantages includes the following steps:

1. Search base point pair between the stored fingerprint template and the fingerprint template to be matched. Base point pair is the positioning reference points for postural calibration between the stored fingerprint template and the fingerprint template to be matched.

2. Conduct global verification. Conduct global verification between ridgeline points of the stored fingerprint template and that of the fingerprint template to be matched (Ridgeline is composed by ridgeline points) and check if the two fingerprints match. The realization is further done through the following 4 steps:

2.1 Fingerprint Template Postural Calibration: Taking Base Point Pair as the alignment target and calculate the translation value & revolving value. Then align the template to be matched $T_2$ to the stored template $T_1$.

2.2 Obtain the total number ($S_1$) of ridgeline points in overlapping area for $T_2$: Align the template to be matched $T_2$ to the stored template $T_1$, there will be an overlapping area. Calculate the number of ridgeline points of $T_2$ in the overlapping area and mark the number as $S_1$;

2.3 Ridgeline Point Verification: Check the number of all the ridgeline points of the template to be matched $T_2$ in the overlapping area and mark the number as $S_2$;

2.4 Calculate the match ratio between the stored fingerprint template and the template to be matched. Compare the result with the judgment threshold value T and output verification result.

The beneficial results of the present invention:

By using global ridgeline information, the efficiency of searching & interference resistance capacity is greatly enhanced. In addition, the present invention overcomes the disadvantage of the fingerprint verification method, i.e. the difficulty to verify fingerprints with too few of minutiae points.

BRIEF DESCRIPTION OF THE DRAWINGS

FIG. 1 shows the Working Principle of the Fingerprint Verification Method Based on Global Ridgeline;

FIG. 2 shows Topological Structure between Minutiae;

FIG. 3 shows Base Point Pair Queue;

FIG. 4 shows Template Postural Calibration FIG. 5 shows Working Principle of Ridgeline Point Verification

DETAILED DESCRIPTION OF THE PREFERRED EMBODIMENTS

The following statement with illustration & example is the further description to the present invention. The present invention, a fingerprint verification method based on global ridgeline as shown in FIG. 1, mainly includes the following steps:

1. Search base point pair between the stored fingerprint template & the fingerprint template to be matched. Base point pair is the positioning reference points for postural calibration between the stored fingerprint template and the template to be matched. Base point pair searching is an important step in the whole fingerprint verification process. The accuracy of base point pair searching directly influences the performance of the invention. The said base point pair point searching method is as per below:

a) Establish the topological structure among minutiae. The following three characteristic values are required in order to establish topological structure among minutiae $P_1$ and $P_2$. See FIG. 2 for illustration.

| 1) d | Distance between minutiae |
|---|---|
| 2) α | The clockwise angle formed between direction of $P_1$ and $P_1P_2$ |
| 3) β | The clockwise angle formed between direction of $P_2$ and $P_1P_2$ | b) Let us set $T_1$ as the stored template; $T_2$ as the template to be matched; $P_i$ as randomly taken minutiae in $T_1$, and $Q_i$ as randomly taken minutiae in $T_2$. Search base point pair in the following steps:
  1) Assume $P_i$ and $Q_i$ belong to the same type of minutiae (either ridgeline ends or ridgeline bifurcations), and the direction error is less than threshold value. Observe the similarity of the ridgeline distribution of $P_i$ and $Q_i$ by taking $P_i$ and $Q_i$ as the reference point respectively. $P_j$ is any minutiae other than $P_i$ in $T_1$, and $Q_j$ is another random minutia other than $Q_i$ in $T_2$. The topological structure between $P_j$ and $P_i$ is marked as A; the topological structure between $Q_j$ and $Q_i$ is marked as B. If the 3 characteristics values of A and B respectively are less than the corresponding threshold value, A and B are regarded as identical topological structure. Calculate the number of identical topological structure of $P_i$ and $Q_i$ in the same way. This number indicates the similarity of $P_i$ and $Q_i$.
  2) Repeat the steps in 1) to all the minutiae in $T_1$ and $T_2$. Save the minutiae, whose similarity is not zero, into a queue, and put them in sequence from high similarity to low.
  3) If there are minutiae in the queue, select several pairs of base point for global verification. If there are no minutiae existing in the queue, please go to step c).
c) Assume $P_i$ and $Q_i$ belong to the same type of minutiae (either ridgeline ends or ridgeline bifurcations), and the direction error is less than threshold value. Observe the similarity of the ridgeline distribution of $P_i$ and $Q_i$ within the reference ranges centered on $P_i$ and $Q_i$ respectively with R as radius for both ranges.
  1) Align $Q_i$ to $P_i$ (including position and direction), all ridgeline points within $Q_i$ reference range will change with $Q_i$. Calculate the number of identical ridgeline points in $T_1$ and $T_2$ within their respective reference range. This number indicates the similarity between $Q_i$ and $P_i$.
  2) Repeat the above steps to all the minutiae in $T_1$ and $T_2$. Save the minutiae, whose similarity is not zero, into a queue, and put them in sequence from high similarity to low.
  3) Select several pairs of base point in the queue for global matching.
2. Conduct global verification. Conduct global verification between ridgeline point from both the stored fingerprint template $T_1$ and the template to be matched $T_2$ (Ridgeline is composed by ridgeline points). The realization is done through the following 4 steps:
2.1 Fingerprint Template Postural Calibration: The stored fingerprint template and the template to be matched must be placed in the same system in order to conduct global ridgeline verification. Take Base Point Pair as the alignment target and calculate the translation value & revolving value. Then align the template to be matched $T_2$ to the stored template $T_1$ as shown in FIG. 4.
2.2 Obtain the total number ($S_1$) of ridgeline points in overlapping area for $T_2$ Align the template to be matched $T_2$ to the stored template $T_1$ there will be an overlapping area. Calculate the number of ridge point of $T_2$ in the overlapping area and mark the number as $S_1$.
2.3 Ridgeline Point Verification:
The verification method based on minutiae generally refers to verification among minutiae from different templates. Whether two fingerprints match depends on the matching ratio of minutiae. The present invention takes into consideration of the global ridgeline information. It verifies all ridge points in the template to see whether two fingerprints match. Minutiae in this case are regarded as base point used for postural calibration. See FIG. 5 for ridgeline point verification:
  a) Take a random point $p_i$ from any ridgeline in the template to be matched $T_2$;
  b) Set an area centered on $p_i$ within the distance of m pixel points as the search area. Search all the ridge points in the stored template $T_1$ within the search area. If there is ridge point in $T_1$ found, go to step c). If no, set $p_i$ as invalid point.
  c) Repeat the step b) for the n ridge points other than $p_i$ on the same ridge in $T_2$;
  d) If ridgeline points from $T_1$ can be found within the search area of the n ridge points and the ridgeline points found are located on the same ridgeline in $T_1$, then $p_i$ shall be regarded as valid point. Otherwise, $p_i$ shall be regarded as invalid point.
Observe all the ridge points in $T_2$ in the overlapping area and calculate the total number ($S_2$) of valid point.
2.4 Calculate the match ratio of the stored fingerprint template and the template to be matched:
  a) Calculate the relative match ratio: $\eta_r = S_2/S_1$
  b) Calculate absolute match ratio$=S_2/S_c$ ($S_c$ is a constant value)
  c) Calculate the final match ratio $\eta_r = \eta_r \times \eta_\alpha = S_2^2/(S_1 \times S_c)$
Relative match ratio $\eta_r$ indicates the extent of matching between two fingerprint templates. The higher the number is, the greater extent of matching is. However, it is not proper to determine whether the fingerprint templates match or not with the relative matching ratio $\eta_r$ as the only criteria. Though the size of overlapping may be small and the value of $S_1$ and $S_2$ are low, it is possible that $\eta_r$ is still high. In this case, it is not appropriate to judge the matching extent solely depending on $\eta_r$. It is thus necessary to set absolute match ratio $\eta_\alpha$ to withhold $S_2$. The key point of so doing is to make it clear that the present method must base on adequate number of ridge points and $S_c$ is a constant value that is above 1. The final match ratio ft $\eta_f$ is the final match points of the two fingerprints. Final results will be output after comparing $\eta_t$ with threshold value T.

What is claimed is:
1. A fingerprint verification method based on global ridgeline, comprising the steps of:
  1. searching base point pair between the stored fingerprint template and the fingerprint template to be matched, said base point pair being the positioning reference points for postural calibration between the stored fingerprint template and the fingerprint template to be matched;
  2. conducting global ridgeline verification, comprising conducting global verification between ridgeline point of the stored fingerprint template and that of the fingerprint template to be matched, and checking if the two fingerprints match, said ridgeline being composed by ridgeline points, the realization being further done through the following 4 steps of:

2.1 fingerprint template postural calibrating comprising the steps of taking base point pair as the alignment target and calculating the translation value & revolving value, and then aligning the fingerprint template to be matched $T_2$ to the stored fingerprint template $T_1$;

2.2 obtaining the total number ($S_1$) of ridgeline points of $T_2$ in overlapping area comprising the steps of aligning the template to be matched $T_2$ to the stored template $T_1$, forming an overlapping area, and calculating the number of ridgeline points of $T_2$ in the overlapping area and marking the number as $S_1$;

2.3 verifying ridgeline points comprising the steps of checking the number of all the ridgeline points of the template to be matched $T_2$ in the overlapping area and marking the number as $S_2$;

2.4 calculating the match ratio of the stored fingerprint template and the fingerprint template to be matched, comparing the result with the judgment threshold value T and outputting the verification results.

2. The fingerprint verification method based on global ridgeline of claim 1, wherein: the step of searching said base point pair includes the following steps of:

a) establishing the topological structure among minutiae, the following three characteristic values being required in order to establish topological structure among minutiae $P_1$ and $P_2$: a distance d between $P_1$ and $P_2$, an angle α formed by clockwise rotating from a tangent of the ridgeline through one of the two minutiae to a connecting line between the two minutiae, and an angle β formed by clockwise rotating from a tangent of the ridgeline through the other of the two minutiae to the connecting line between the two minutiae;

b) designating $T_1$, as the stored template, $T_2$ as the template to be matched, $P_i$ as randomly taken minutiae in $T_1$, and $Q_i$ as randomly taken minutiae in $T_2$, and searching base point pair in the following steps of:

1) assuming that $P_i$ and $Q_i$ belong to the same type of minutiae (either ridgeline ends or ridgeline bifurcations), and the direction error is less than the threshold value, observing the similarity of the ridgeline distribution of $P_i$ and $Q_i$ by taking $P_i$ and $Q_i$ as reference point respectively $P_j$ being any minutiae other than $P_i$ in $T_1$, and $Q_j$ being another random minutia other than $Q_i$ in $T_2$, designating the topological structure between $P_j$ and $P_i$ as A and the topological structure between $Q_j$ and $Q_i$ as B, regarding A and B as identical topological structure if the 3 characteristics values of A and B are less than the corresponding threshold value, calculating the number of identical topological structure of $P_i$ and $Q_i$ in the same way, said number being indicative of the similarity between $P_i$ and $Q_i$;

2) repeating the steps in 1) to all the minutiae in $T_1$ and $T_2$, saving the minutiae having non-zero similarity into a queue, and sequencing the minutiae according to their similarities in an ascending or descending order.

3) selecting several pairs of base point having the highest similarity for global verification if there are minutiae in the queue, and going to step c) if there are no minutiae existing in the queue;

c) assuming that $P_i$ in $T_1$ and $Q_i$ in $T_2$ belong to the same type of minutiae (either ridgeline ends or ridgeline bifurcations) and the direction error is less than threshold value, observing the similarity of the ridgeline distribution of $P_i$ and $Q_i$ within the reference ranges centered on $P_i$ and $Q_i$ respectively with R as radius through the following steps of, said R being a constant value;

1) aligning $Q_i$ to $P_i$ (including position and direction), all ridgeline points within the $Q_i$ reference range being change with $Q_i$, and calculating the number of identical ridgeline points in $T_1$ and $T_2$ within their respective reference range, said number being indicative of the similarity between $Q_i$ and $P_i$;

2) repeating the above steps to all the minutiae in $T_1$ and $T_2$, saving the minutiae having non-zero similarity into a queue, and sequencing the minutiae according to their similarities in an ascending or descending order;

3) selecting several pairs of base point in the queue with highest similarity for global matching.

3. The fingerprint verification method based on global ridgeline of claim 1, wherein:

the step of verifying ridgeline points includes the following steps of:

a) taking a random point $p_i$ from any ridgeline in the template to be matched $T_2$;

b) setting an area centered on $p_i$ within the distance of m pixel points as the search area, searching all the ridgeline points in the stored template $T_1$ within the search area, and going to step c) if any ridgeline points in $T_1$ are found, and setting $p_i$ as invalid point if no, c) repeating the step b) for n ridgeline points before and after $p_i$ on the same ridgeline in $T_2$;

d) regarding $p_i$ as a valid point if ridgeline points from $T_1$ can be found within the search area for all the n ridgeline points and the ridgeline points found are located on the same ridgeline in $T_1$, and regarding pi as an invalid point if not so;

and wherein the above steps a)-d) are executed for all the ridgeline points in $T_2$ in the overlapping area in order to calculate the total number ($S_2$) of valid points.

4. The fingerprint verification method based on global ridgeline of claim 1, wherein:

the match ratio is calculated as per below:

d) calculate the relative match ratio: $\eta_r = S_2/S_1$ e) calculate absolute match ratio $= S_2/S_c$ ($S_c$ is a constant value)

f) calculate the final match ratio $\eta_f = \eta_a = S_2^2/(S_1 \times S_c)$ wherein $S_1$ refers to the number of ridgeline points on $T_2$ in the overlapping area after aligning the template to be matched $T_2$ to the stored template $T_1$, $S_2$ is the number of valid point, and $\eta_f$ is the final matching result of the two fingerprints.

5. The fingerprint verification method based on global ridgeline of claim 1, wherein: fingerprint template being formed with thinned global ridgeline afterextracting fingerprint minutiae.

6. A fingerprint verification apparatus based on global ridgeline, comprisingbase point pair searching means for searching a pair of base points from a stored fingerprint template and a fingerprint template to be matched, said base point pair being positioning reference points for postural calibration between said stored fingerprint template and said fingerprint template to be matched;

global ridgeline matching means for conducting global verification between ridgeline points of said stored fingerprint template and said fingerprint template to be matched so as to determine whether the two fingerprint templates match, wherein a ridgeline is composed by ridgeline points, and said global ridgeline matching means including:

fingerprint template postural calibration means for taking said searched base point pair as alignment targets, calculating a translation value and a revolving value, and moving said fingerprint template to be matched $T_2$ based on the calculated translation value and revolving value so as to aligning said fingerprint template to be matched $T_2$ with the stored fingerprint template $T_1$;

ridgeline point calculation means for calculating the total number $S_1$ of the ridgeline points of said fingerprint template to be matched $T_2$ in an overlapping area, said overlapping area being formed when said fingerprint template to be matched $T_2$ aligned with said stored fingerprint template $T_1$;

ridgeline point verification means for calculating the number $S_2$ of the ridgeline points of the template to be matched $T_2$ which match with those of said stored fingerprint template $T_1$, from all the ridgeline points of the template to be matched $T_2$ in said overlapping area;

match ratio calculation means for calculating match ratios between said stored fingerprint template and said fingerprint template to be matched and outputting the results of fingerprint verification based on the calculated match ratios.

7. The fingerprint verification apparatus based on global ridgeline of claim 6, wherein: said base point pair searching means includes:

topological structure Generation means for establishing a topological structure for any two minutiae in a fingerprint template, said minutiae referring ends or bifurcations of ridgelines in the fingerprint template, said topological structure being characterized by the following three characteristic values: a distance d between said two minutiae $P_1$ and $P_2$, an angle $\alpha$ formed by clockwise rotating from a tangent of the ridgeline through one of the two minutiae to a connecting line between the two minutiae, and an angle $\beta$ formed by clockwise rotating from a tangent of the ridgeline through the other of the two minutiae to the connecting line between the two minutiae;

a first similarity calculation means for calculating a similarity between any two minutiae $P_i$ and $Q_i$ being respectively from said stored fingerprint template and said fingerprint template to be matched, having the same minutiae type of either ridgeline ends or ridgeline bifurcations and having the differences between their angle characteristic values less than a threshold value, wherein $P_i$ is a minutia in $T_1$, $Q_i$ is a minutia in $T_2$, $P_j$ is a minutiae different from $P_i$ in $T_1$, and $Q_j$ is a minutia different from $Q_i$ in $T_2$, said topological structure between $P_j$ and $P_i$ is designated as A, said topological structure between $Q_j$ and $Q_i$ is designated as B, A and B are regarded as having identical topological structures if each difference of the three characteristics values between A and B is less than the respective threshold value, the similarity of $P_i$ and $Q_i$ is obtained by calculating the number of the identical topological structures of $P_i$ and $Q_i$ in the same way;

a first similarity sequencing means for saving the minutiae having non-zero similarity into a first queue, and sequencing the minutiae according to their similarities in an ascending or descending order;

a first base point pair selection means for selecting several pairs of base points having the highest similarities from the first queue;

a second similarity calculation means for calculating a similarity between the ridgeline profiles on which any two minutiae $P_i$ and $Q_i$ lies within their R-radius reference ranges when said first queue is null, said two minutiae $P_i$ and $Q_i$ being respectively from said stored fingerprint template and said fingerprint template to be matched, having the same minutiae type of either ridgeline ends or ridgeline bifurcations and having the differences between their angle characteristic values less than a threshold value wherein $P_i$ is a minutia in $T_1$, $Q_i$ is a minutia in $T_2$, $Q_i$ is aligned to $P_i$ for both position and direction, all ridgeline points within the R-radius reference range of $Q_i$ will change with $Q_i$, the similarity between $Q_i$ and $P_i$ is obtained by calculating the number of identical ridgeline points in T, and $T_2$ within said reference ranges;

a second similarity sequencing means for saving the minutiae having non-zero similarity into a second queue, and sequencing the minutiae according to their similarities in an ascending or descending order;

a second base point pair selection means for select several pairs of base points having the highest similarities from the second queue.

8. The fingerprint verification means based on global ridgeline of claim 6, wherein: said ridgeline point verification means is implemented to:

a) take a point $P_i$ from a ridgeline in the fingerprint template to be matched $T_2$;

b) search all the ridgeline points from the stored fingerprint template T, within a search area centered on $P_i$ and having a radius of m pixel points, going to step c) if there is ridgeline points of $T_1$ found in said search area, and setting $P_i$ as invalid point if not so;

c) repeat the step b) for n ridgeline points before and after $P_i$ on the same ridgeline in $T_2$;

d) regard $P_i$ as a valid point if there are ridgeline points of $T_1$ within the search area for all the n ridgeline points and the ridgeline points are located on the same ridgeline in $T_1$, and regard $P_i$ as an invalid point if not so;

e) observe all the ridgeline points in $T_2$ within the overlapping area by repeating steps a)-d) so as to obtain the total number $S_2$ of valid points.

9. The fingerprint verification apparatus based on global ridgeline of claim 6, wherein:

said match ratio calculation means is implemented to:

calculate the relative match ratio: $\eta_r = S_2/S_1$;

calculate the absolute match ratio: $\eta_\alpha = S_2/S_c$ wherein $S_c$ is a constant value;

calculate the final match ratio $\eta_f = \eta_r \times \eta_\alpha = S_2^2/(S_1 \times S_c)$, wherein $S_1$ refers to the number of ridgeline points on $T_2$ in the overlapping area after aligning the template to be matched $T_2$ to the stored fingerprint template $T_1$, $S_2$ is the number of valid points, $\eta_f$ is the final matching result of the two fingerprints.

10. The fingerprint verification means based on global ridgeline of claim 6, wherein:

fingerprint template being formed with thinned global ridgeline after extracting fingerprint minutiae.

* * * * *